United States Patent [19]

Galer

[11] 4,450,022

[45] May 22, 1984

[54] METHOD AND APPARATUS FOR MAKING REINFORCED CEMENT BOARD

[75] Inventor: Richard E. Galer, Hanover Park, Ill.

[73] Assignee: United States Gypsum Company, Chicago, Ill.

[21] Appl. No.: 383,674

[22] Filed: Jun. 1, 1982

[51] Int. Cl.³ .......................... B28B 1/30; B28B 23/02; B32B 31/00

[52] U.S. Cl. .......................................... 156/42; 118/56; 156/73.6; 156/324; 156/346; 264/70; 264/71; 264/257; 264/279.1; 425/122; 425/456; 427/346

[58] Field of Search ........................ 156/42, 40, 41, 39, 156/43, 62.2, 73.6, 324, 346, 347, 348, 242; 427/346, 57; 118/56, 57, 120, 123; 264/46.4, 70, 71, 257, 258, 279, 279.1, 299, 109; 425/111, 115, 224, 363, 522, 456, 90, 94; 162/209, 105, 107, 108, 268

[56] References Cited

U.S. PATENT DOCUMENTS

| | | | |
|---|---|---|---|
| 3,284,980 | 11/1966 | Dinkel | 52/600 |
| 3,832,250 | 8/1974 | Pearson | 156/40 |
| 4,159,361 | 6/1979 | Schupack | 428/240 |
| 4,281,952 | 8/1981 | Clear | 414/82 |
| 4,298,413 | 11/1981 | Teare | 156/42 |
| 4,364,790 | 12/1982 | Delcoigne | 156/346 |

FOREIGN PATENT DOCUMENTS 2053779 2/1981 United Kingdom .

*Primary Examiner*—Michael W. Ball

*Attorney, Agent, or Firm*—Robert M. Didrick; Samuel Kurlandsky; Robert H. Robinson

[57] ABSTRACT

A network of reinforcing fibers is pressed against the surface of an underlying carrier sheet by the weight of a concrete mix. A vertical gap between the sheet and the network is created so that the concrete mix may penetrate the voids of the network and spread out on the underlying sheet to embed the fibers.

19 Claims, 4 Drawing Figures

METHOD AND APPARATUS FOR MAKING REINFORCED CEMENT BOARD

This invention relates to the continuous production of a reinforced cementitious panel. More particularly, it relates to a method and an apparatus for casting a cementitious slurry in the form of a thin, indefinitely long panel whose faces are exposed to the environment and wherein the reinforcement is supplied by fibers submerged just below one or both of said faces.

Panels in which the set composition comprises a single cementitious material may be made by the method and apparatus of this invention as well as panels in which the core is faced by a cementitious material having a different composition.

Reinforced panels having cores formed of a cementitious composition are presently known. U.S. Pat. No. 1,439,954 discloses a wallboard having a core of gypsum or Portland cement and a mesh material such as cotton gauze, wire cloth, perforated paper or perforated cloth applied to both faces of the core while the cementitious material is still in the plastic state.

U.S. Pat. No. 3,284,980 (Dinkel) discloses a pre-cast, lightweight concrete panel having a cellular core, a thin, high density layer on each face, and a layer of fiber mesh embedded in each of the high density layers. Each panel is cast separately in forms in a step-wise procedure beginning with a thin layer of dense concrete mix, laying the mesh thereupon, pouring the lightweight concrete mix over the mesh to form the core, laying a second layer of mesh over the core mix, and pouring another layer of dense concrete mix over the second mesh layer.

The problem common to all methods of production of fiber mesh reinforced cementitious panels is the achievement of adequate penetration of the voids in the mesh by the cementitious mixture so that the mesh is covered by a smooth, continuous, uniformly thin layer of said material and is properly anchored in the panel. The problem is particularly troublesome in a continuous process wherein the fiber mesh is laid on a flat support surface and the cementitious material is deposited on the mesh. The weight of the material presses the mesh tightly against the support surface, thereby effectively preventing passage of the material to the other side of the fibers. In the case of concrete and other heavy, aggregate filled materials, adequate penetration of the mesh is especially difficult to achieve.

Clear, in U.S. Pat. No. 4,203,788, discloses a continuous method for the production of the panels disclosed by Dinkel. In said method, a continuous web of glass fiber mesh is passed through a cementitious slurry, the slurry-laden mesh is laid on a plurality of moving carrier sheets, a lightweight concrete mix is deposited on the mesh as it moves along with the carrier sheets, a second continuous web of mesh is passed through a cementitious slurry and laid over the lightweight concrete core mix. The elongated sheet of concrete travels to a cutter station where the sheet is cut into individual panels. Clear warns that flexing of the uncured panel has the tendency to cause the various layers to move with respect to each other and to separate, thereby destroying the integrity of the panel and reducing the strength characteristics of the panel. The forming, cutting and stacking operations of Clear are all designed to minimize flexing of the uncured panel.

Schupack, in U.S. Pat. No. 4,159,361, discloses a cold formable cementitious panel in which fabric reinforcing layers are encapsulated by the cementitious core. The layers of reinforcing fabric and cementitious material of the Schupack panel are laid and deposited on a vibrating forming table from a fabrication train which reciprocates longitudinally over the table. The cementitious core mix is smoothed by a laterally oscillating screed.

British Patent Application No. 2 053 779 A discloses a method for the continuous production of a building board which comprises advancing a pervious fabric on a lower support surface, depositing a slurry of cementitious material such as gypsum plaster on said advancing fabric, contacting the exposed face of the slurry with a second fabric, passing the fabric faced slurry under a second support surface, and advancing the fabric faced slurry between the two support surfaces while vibrating said surfaces. The vibration is said to cause the slurry to penetrate through the fabric to form a thin, continuous film on the outer faces of the fabric. Now, a novel method and apparatus have been discovered whereby an indefinitely long ribbon of fiber-reinforced cementitious material may be produced continuously. In this method, fibers lying on a moving support surface, such as an endless conveyor belt, are passed continuously under a stationary chute from which an aqueous cementitious mixture is deposited. A vertical displacement of the fibers from the support surface permits the mixture to spread across the underside of the fibers to submerge said fibers in a uniformly thin, continuous layer of cementitious material.

It is therefore, an object of this invention to provide a novel apparatus for the continuous production of a fiber- reinforced cementitious panel.

It is a further object of this invention to provide a novel method for the continuous production of a smooth surfaced fiber-reinforced cementitious panel.

It is still a further object of this invention to provide a method for the continuous production of a monolithic concrete panel having a network of reinforcing fibers immediately below one or both faces of said panel.

It is a related object of this invention to provide a method for the continuous production of a fiber-reinforced concrete panel in which the core and faces thereof are cast in a single operation from only one cementitious mixture.

It is yet another object of this invention to provide a method for the continuous production of a fiber-reinforced concrete panel in which the exterior surfaces of the panel are cast from a cementitious mixture different from that which is used to form the core of the panel.

It is a still further object of the invention to provide a novel method for the continuous production of a fiber-reinforced gypsum board.

These and other objects which will become apparent from the following description of the invention are achieved by the apparatus illustrated in the drawings and the method which comprises continuously forming an aqueous slurry of a cementitious material; continuously laying an indefinitely long span of reinforcing fibers on a moving carrier sheet; towing said carrier sheet and fiber overlay away from the locus whereat the fibers are laid; creating a gap between the carrier sheet and the fibers, said gap substantially spanning the breadth of the fiber overlay; continuously depositing said aqueous slurry on said fiber overlay and distributing it across the breadth of the overlay, thereby fostering the embedment of the fibers in said slurry; and cutting the reinforced panel into the desired lengths.

The reinforcing fibers may be in the form of a network such as a woven mesh or scrim, or a non-woven pervious fabric. In some cases, sufficient strength is imparted to the board by several parallel strands of roving running throughout the length of the board. The fibers may be made, for example, from glass, nylon, metal, or aramid resin which is sold under the trademark Kevlar. When a woven mesh or scrim is employed, the mesh size is selected according to the strength desired and the size of the aggregate particles in the slurry. A mesh having a thread count per inch of from 4×4 to 18×14 or 10×20 is acceptable for most purposes. Non-woven membranes must be sufficiently porous to permit penetration by the slurry. When a glass fiber network is used in conjunction with an alkaline cementitious material, the fibers may be made from an alkaline resistant glass or have a protective resin coating instead of being embedded in a latex modified slurry. For purposes of illustration, the invention is described hereinafter with reference to a network of fibers.

The carrier sheet may be made of a strippable material or of one which forms a bond with the surface of the panel. A preferred material is a strippable kraft paper coated on one side with a thin layer of polyethylene; a 35 pound paper with 8 pounds of polyethylene per thousand square feet is an example of such material. An endless belt of rubber or a plastic such as polyethylene may also serve as the carrier sheet when such a belt is propelled around a set of rollers. A flat-bottomed trough-like belt also may be used as the carrier sheet. When it is desired that the carrier sheet serve also as a decorative face for the panel, a material which adheres to the cementitious material is selected.

Specific embodiments of the method and apparatus, along with other aspects and advantages of the invention, will be understood from the following more detailed description when considered in conjunction with the drawings, in which.

Figure 1:
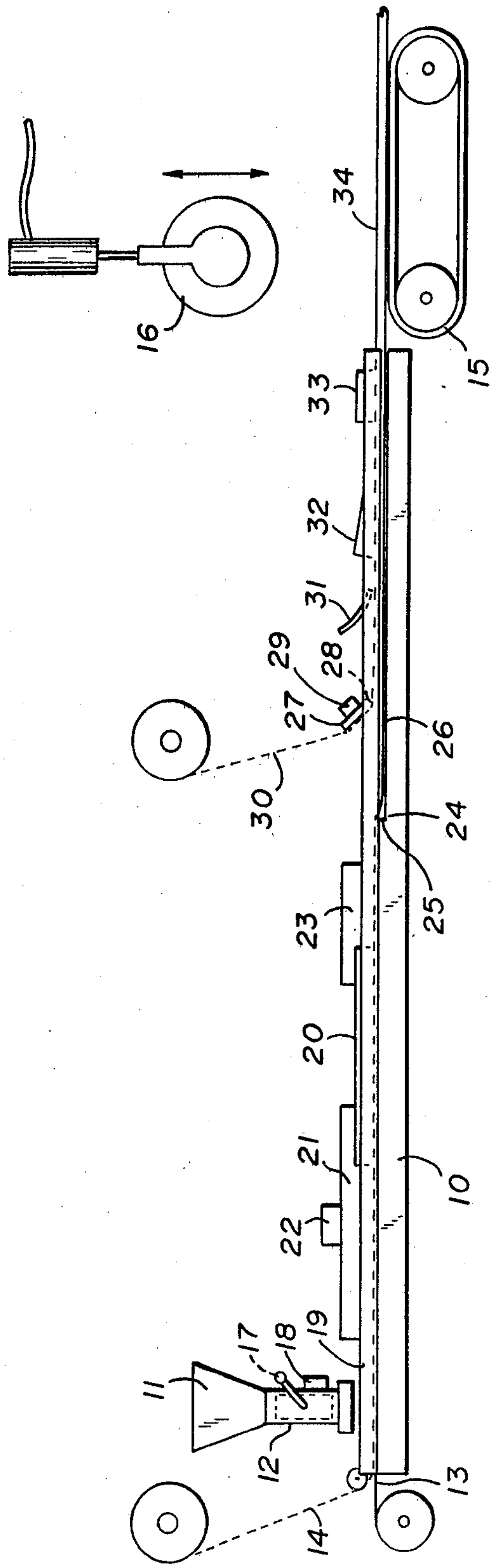
FIG. 1 is a diagrammatic elevational view of said apparatus and accessory equipment.
Figure 2:
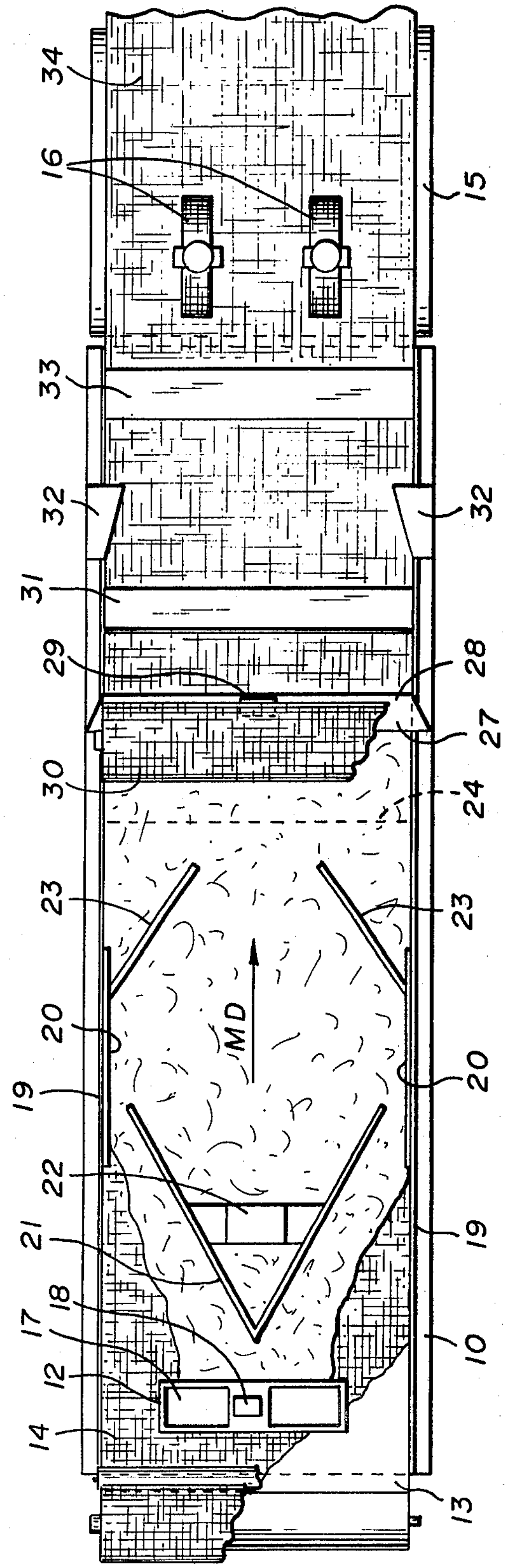
FIG. 2 is a diagrammatic plan view of the panel manufacturing apparatus of this invention.

As shown in FIGS. 1 and 2, the apparatus comprises a forming table 10, disposed below a concrete mixer 11 and distribution chute 12, and adapted to support a carrier sheet 13 and a first network 14 of a reinforcing fiber. The distal end of the forming table 10 is contiguous to the proximate end of a conveyor belt 15. A roller clamp 16, such as a pair of rubber-tired wheels connected to a pneumatically slidable shaft, is mounted above and in operative relation to the conveyer belt 15. A pivotable deflector 17 is mounted within the distribution chute 12 so that a concrete mix may be directed across the breadth of the forming table 10. A first vibration means 18 is mounted on the chute 12 to maintain a steady flow of the concrete mix.

Two edge guides 19 are mounted in spaced apart, parallel relationship along the edges of the forming table 10. A pair of guide rails 20 are likewise mounted on the table 10 but are displaced in-board from said guides 19 and are disposed above the table 10 to permit passage of the sheet 13 and the network 14 along said table 10.

A distribution plow 21 is mounted above the table 10 and a second vibration means 22 is attached to said plow. A pair of scraper bars 23 are mounted above the table 10 so that their distal ends converge toward each other.

The surface of the forming table 10 forms the upper tread of a step 24. A riser 25 connects said upper tread with a lower tread 26 of said step 24.

A transverse screed 27 is adjustably mounted above the lower tread 26 so that the bottom edge 28 of said screed may be moved upward or downward in keeping with the thickness of the board being manufactured. Said screed 27 has a third vibration means 29 attached to it. A second reinforcing fiber network 30 is mounted in roll form above the table 10 so that it may be payed out under the screed 27.

The distance between the step 24 and the screed 27 is preferably from about 1 inch to about 3 inches.

A trowel 31 is mounted transversely above the table 10 so that it may contact the surface of the board being manufactured. The edge turners 32 are mounted on and in cooperation with the edge guides 19. A finishing trowel 33 is mounted above the distal end of the forming table 10.

Figure 3:
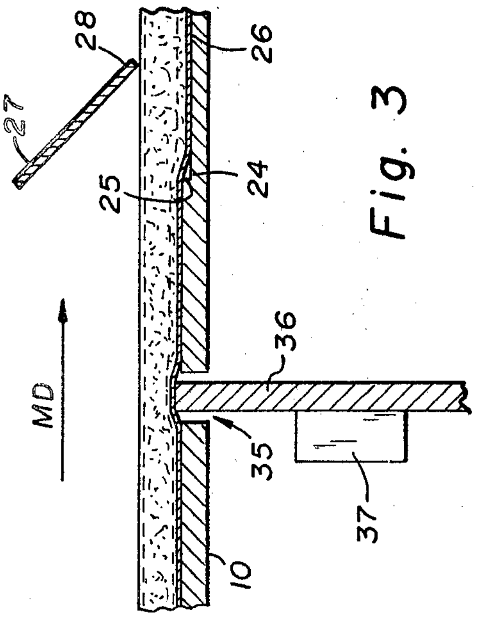
FIG. 3 is a cross section of a modified portion of the apparatus of FIG. 1 showing another embodiment of this invention.

In FIG. 3, there is shown another gap creating means in the form of a transverse slot 35 in the forming table 10 and a support bar 36, aligned with said slot 35, projecting upward through said slot to raise the carrier sheet 13 and network 14 slightly above the plane of the forming table 10; a distance of about 1/16 inch is sufficient. The slot 35 and bar 36 may be used as a primary or a secondary gap-creating means in combination with the step 24 or they may be used as the only means for creating the gap. Again, vibration may be used to foster penetration of the network 14 by the concrete mix; this is accomplished by mounting a fourth vibration means 37 on the support bar 36. Vibration of the support bar 36 also serves to consolidate the concrete mix and for this reason it is preferred that when slot 35, bar 36, and vibrator 37 are used they be placed upstream from the plow 21.

Going on now to a description of the method of this invention with reference to FIGS. 1 and 2, a continuous strip of a carrier sheet 13 is fed onto a forming table 10 and passed under a concrete mixer 11 and a distribution chute 12. Likewise, a continuous strip of a first network 14 of reinforcing fiber is fed under the chute 12 and laid on the sheet 13. The coupled sheet 13 and network 14 are passed over the table 10 and placed between a conveyor belt 15 and a roller clamp 16. The roller clamp 16 is engaged and the conveyor belt 15 is started so that the sheet and network are towed in the direction indicated by the arrow MD, thus causing a longitudinal tension in the sheet 13 and network 14. A concrete mix is continuously made in mixer 11 and discharged into the distribution chute 12 in which an adjustable deflector 17 is situated. The flow of the concrete mix as it is directed onto the moving network 14 by the chute 12 and the deflector 17 is maintained by a first vibration means 18 mounted on the chute. The lateral edges of the carrier sheet 13 are bent upward by the edge guides 19 and are folded so that they are substantially perpendicular to the plane of the forming table 10 as they pass between the edge guides 19 and the guide rails 20. The concrete mix is spread across the breadth of the network 14 by a distribution plow 21 and by the action of a second vibration means 22. The distribution of the concrete mix is further achieved by the scraper bars 23 in the event that excessive amounts of the concrete mix gather along the edges of the network 14. The distribution plow 21 and the scraper bars 23 are vertically adjustable to gauge the thickness of the panel being made.

The step 24 in the forming table 10 acts as a means for creating a gap between the carrier sheet 13 and the network 14 as they are pulled over the lower tread 26 under tension. The weight of the concrete mix causes a portion of it to pass through the voids of the network 14 and press down on the carrier sheet 13 so that it sags onto the lower tread 26. Thus, the upstream portion, i.e., the first transverse zone, of the carrier sheet is made to travel in a higher plane than the portion immediately downstream from the riser 25. The gap thus created is filled and the network 14 is thoroughly embedded in the concrete mix. The thickness of the layer of concrete mix formed on the bottom side of the network is determined by the speed of the conveyor belt 15, the consistency of the concrete mix, and the height of the riser 25. Said height may be from about 0.1 inch (2.5mm) to about 0.3 inch. Preferably, said riser is from about 0.1 to about 0.15 inch high.

A second reinforcing fiber network 30 is fed under the screed 27 whose bottom edge 28 projects just far enough below the top surface of the concrete mix to submerge the fiber network 30 therein so that said network is substantially flush with the screeded surface or immediately below said surface. Preferably, the depth of submersion is not greater than about 0.1 inch (about 2.5mm); more preferably it is about 0.03 inch (about 0.75mm) or less.

Submersion of the fiber network 30 may be improved, particularly when a highly viscous slurry (e.g., a concrete mix having a w/c ration of 0.25) is being used, by vibrating the screed 27; a third vibration means 29 is mounted on the screed for that purpose.

A trowel 31 presses down on the surface of the concrete mix with pressure just sufficient to remove surface blemishes and imperfections.

The upright edges of the carrier sheet 13 are turned inward and onto the surface of the concrete mix as said edges are drawn past the turners 32. Final dressing of the surface is accomplished as it is drawn under the finishing trowel 33 before the slurry laden panel 34 is transferred from the forming table 11 to the conveyor belt 15. When a sufficient length of the panel 34 has been transferred to the belt 15 to cause a drag on the belt the roller clamp 16 is raised above the plane of the panel 34.

The panel 34 is conveyed toward a suitable cutting device (not shown) such as a rotating guillotine-type blade until the concrete mix has set. The panel 34 is then cut into the desired lengths and cured. Curing at an elevated temperature (approximately 150° F. or 65° C. as the maximum) in a humid atmosphere is preferred.

Figure 4:
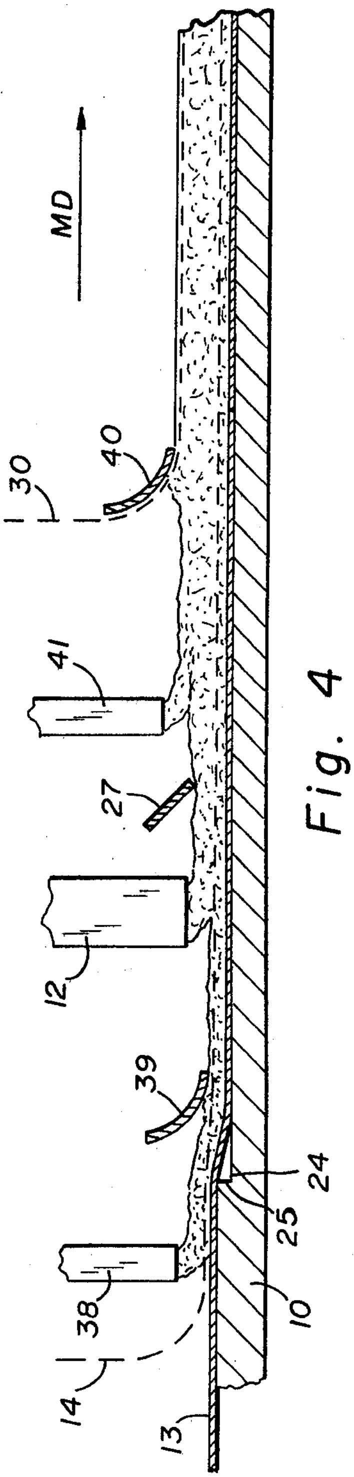
FIG. 4 is a schematic cross section of another modification of the apparatus of FIG. 1 showing another embodiment of this invention.

For some purposes, it is desirable to use a grout to embed the reinforcing fibers in the panel of this invention. For example, when non-alkaline resistant glass fibers are used, they must be protected by embedding the network in a latex modified grout. A grout may be used also when a panel having a very smooth surface is desired. In such cases, the method and apparatus of this invention are modified as shown in FIG. 4. A grout mixer with a tranversely reciprocable spout 38 and a flexible spreader 39 are mounted above the forming table 10 so that grout may be distributed over the breadth of the network 14 at a location upstream from the concrete distribution chute 12. Penetration of the network by the grout is fostered by a gap created between the carrier sheet 13 and the network as they pass over the step 24 between the spout 38 and the spreader 39. The core mix of concrete is deposited on top of the grout and is leveled by the screed 27. The procedure described above is followed then unless a second layer of grout is desired. For that purpose, the network 30 is fed under a second flexible spreader 40 instead of under the screed 27 and grout is deposited from a second mixer through a transversely reciprocable spout 41 placed between the screed 27 and the spreader 40.

To aid curing of the panel by retaining moisture, a cover sheet may be laid over the slurry after said slurry has traveled beyond the screed 27 or the spreader 40. The cover sheet is of the same width as the panel being made whereas the carrier sheet 13 may be wider to allow for the folding upward and inward by guide rails 20 and edge turners 32. The combination of a folded carrier sheet 13 and the cover sheet forms an envelope for the panel which may be retained for protection of the surfaces until the panel is to be installed. The cover sheet is non-adherent to the slurry and preferably is a polyethylene coated kraft paper.

The slurry comprises a mixture of water and at least one inorganic cementitious material which sets upon hydration, as exemplified by a calcined gypsum or a hydraulic cement. The hydraulic cement is further exemplified by the portland cements, high alumina cements, high early strength cements, rapid hardening cements, pozzolanic cements, and mixtures of portland cements with high alumina cements and/or gypsum. The slurry may also contain mineral or nonmineral aggregates; examples of the former include naturally occurring materials such as sand, gravel, vermiculite, quarried rock, perlite, and volcanic tuff or manufactured aggregate such as expanded slag, shale, clay, and the like. Thus, the slurry may be a grout, mortar, or concrete mix. Lightweight aggregates such as perlite and the expanded materials are preferred when concrete panels are intended for use as wallboards. The ratio of mineral aggregate to hydraulic cement may range from about 3:4 to about 6:1 but the preferred range is from about 1:1 to about 3:1. Nonmineral aggregate is exemplified by expanded polystyrene beads. Although the particle size distribution of the aggregate should be rather broad to avoid close packing, the maximum size of the aggregate particles is about ⅓ of the thickness of the panel being produced. Panels usually are made in ⅜", ½" and ⅝" thicknesses but they may be much thinner or even thicker.

The slurry may also contain fly ash and other admixtures such as accelerators, retarders, foaming agents, and plasticizers, including the so-called "superplasticizers."

The composition of the slurry will, of course, determine the time when final set occurs and, in turn, the length and speed of travel of the panel 34 before it is cut. A final set within 15 to 30 minutes is preferred but a longer time may be accommodated. A water to cement ratio of from about 0.3:1 to about 0.4:1 is preferred.

While several particular embodiments of this invention have been described and illustrated, it will be understood that the invention may be modified in many ways within the scope and spirit of the appended claims.

What is claimed is:

1. A method for manufacturing a reinforced cementitious panel comprising:

continuously forming a slurry comprising a cementitious material and water;

continuously towing an indefinitely long carrier sheet over a support surface;

continuously laying an indefinitely long span of reinforcing fibers over said sheet;

placing said sheet and its fiber overlay under longitudinal tension;

continuously depositing said slurry on said overlay and distributing it across the breadth of the overlay;

creating a gap between said sheet and said overlay to be filled by said slurry, said gap substantially spanning the breadth of the overlay and being created by urging a first transverse zone of said sheet to travel through a higher plane than a second transverse zone immediately adjacent to and downstream from the first zone;

thereby causing said slurry to embed said fibers; and cutting the reinforced panel into the desired lengths.

2. The method of claim 1 wherein the slurry further comprises an aggregate having a maximum particle size of about ⅓ of the thickness of the panel.

3. The method of claim 1 wherein said fibers are in the form of a network.

4. The method of claim 3 characterized further by the continuous submerging of a second indefinitely long network of reinforcing fiber below the top surface of the distributed slurry.

5. The method of claim 4 wherein the submersion is achieved by vibration of the slurry.

6. The method of claim 4 wherein the submersion is achieved by passing the fiber network-covered slurry under a vibrating screed.

7. The method of claim 1 wherein said gap is created by moving said sheet and its fiber overlay over an upstream portion of the support surface whose horizontal surface terminates abruptly and a downstream portion lying in a lower parallel plane.

8. The method of claim 1 wherein said gap is created by drawing the sheet and its fiber overlay over a bar spanning the breadth of the support surface and projecting above said surface.

9. The method of claim 8 wherein the sheet and fiber network are drawn over said bar and across a breach in said surface immediately adjacent to said bar.

10. The method of claim 3 wherein said slurry is vibrated to foster its penetration of the network.

11. A method for manufacturing a reinforced concrete panel comprising:

continuously forming a grout;

continuously towing an indefinitely long carrier sheet over a support surface;

continuously laying an indefintely long network of reinforcing fiber on said sheet;

placing said sheet and said fiber network under longitudinal tension;

creating a gap between said sheet and said fiber network by urging a first transverse zone of said sheet to travel through a higher plane than a second transverse zone immediately adjacent to and downstream from the first zone so that the network may be penetrated by said grout;

continuously distributing said grout over the breadth of the network upstream from said gap;

continuously forming a concrete mixture and depositing it on said grout;

vibrating said grout and said concrete mixture to foster penetration of said network by the grout and to distribute the concrete mixture over the breadth of the grout layer;

conveying the group and concrete laden sheet and fiber network toward a cutting device until said grout and concrete mix set;

cutting the reinforced panel into the desired lengths.

12. The method of claim 11 wherein a second layer of a grout is distributed over the concrete mix layer.

13. The method of claim 11 wherein a second reinforcing fiber network is laid continuously over said concrete mix and passed under a screed to cause submersion of said network therein.

14. The method of claim 12 wherein a second reinforcing fiber network is laid continuously over the second layer of grout and said layer is vibrated to submerge said network therein.

15. A method for manufacturing a reinforced cementitious panel comprising:

continuously forming a slurry comprising a hydraulic cement and water;

continuously towing an indefinitely long strippable sheet of paper over a forming table and under a vibratable slurry discharge chute and a vibratable screed;

continuously laying an indefinitely long network of reinforcing fibers on said paper and feeding said network under said chute and screed;

placing said paper and said fiber network under longitudinal tension;

creating a gap between the sheet and fiber network by urging a first transverse zone of said sheet to travel through a higher plane than a second transverse zone of said paper immediately adjacent to and downstream from the first zone;

continuously discharging said slurry on said fiber network upstream from said vibratable screed;

vibrating said chute and screed to distribute said slurry over the breadth of said fiber network, said gap being filled by the ooze of the slurry through the voids of the network; and cutting the reinforced panel into the desired lengths.

16. Apparatus for the continuous manufacture of reinforced cementitious paneling, said apparatus comprising:

a forming table and a conveyor belt for continuously feeding a carrier sheet along a predetermined path, means for continuously laying reinforcing fibers over the advancing sheet, means for urging a first transverse zone of said sheet to travel through a higher plane than a second transverse zone of said sheet immediately adjacent to and downstream from the first zone thereby creating a gap transverse to said path between said sheet and the fiber overlay, means for depositing a cementitious slurry on the advancing fiber overlay upstream from said gap-creating means, means for leveling said slurry and distributing it transversely to said path, whereby said slurry is caused to fill said gap and embed said fiber overlay during its passage over said gap-creating means.

17. The apparatus of claim 16 wherein said urging means comprises a step in the forming table characterized by a tread element which is lower than the upstream portion of said table.

18. The apparatus of claim 16 where said urging means comprises a transverse slot in the forming table and a support bar projecting up through and aligned with said slot.

19. The apparatus of claim 16 wherein said forming table is characterized by a transverse slot and said urging means comprises, in combination, a stepped-down portion of the forming table downstream from said slot and a transverse bar projecting up through and aligned with said slot.

* * * * *